(12) United States Patent
Ishikawa et al.

(10) Patent No.: US 6,198,997 B1
(45) Date of Patent: Mar. 6, 2001

(54) AIR BAG SYSTEM AS A SUPPLEMENTARY RESTRAINT SYSTEM TO SEAT BELT APPARATUS

(75) Inventors: Toshihiro Ishikawa; Yutaka Tsukiji; Takeshi Takagi, all of Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/159,593

(22) Filed: Sep. 24, 1998

(30) Foreign Application Priority Data

Sep. 25, 1997 (JP) .................................................... 9-279949

(51) Int. Cl.[7] .......................... B60R 22/00; B60R 21/32; G05D 1/00
(52) U.S. Cl. ........................ 701/45; 701/48; 180/282; 280/734; 280/735
(58) Field of Search .................. 701/45, 48; 280/734, 280/735; 307/10.1; 340/436, 438; 180/271, 272, 282

(56) References Cited

U.S. PATENT DOCUMENTS

| | | | |
|---|---|---|---|
| 4,021,057 | * | 5/1977 | Held et al. ............................ 280/735 |
| 5,209,510 | * | 5/1993 | Mamiya ................................ 280/732 |
| 5,400,487 | * | 3/1995 | Gioutsos et al. ..................... 280/735 |
| 5,400,867 | | 3/1995 | Müller et al. ......................... 180/268 |
| 5,411,289 | * | 5/1995 | Smith et al. .......................... 280/735 |
| 5,413,378 | * | 5/1995 | Steffens, Jr. et al. ................ 280/735 |
| 5,626,359 | * | 5/1997 | Steffens, Jr. et al. ................ 280/735 |
| 5,835,873 | * | 11/1998 | Darby et al. ........................... 701/45 |
| 5,900,677 | * | 5/1999 | Musiol et al. ...................... 370/10.1 |
| 5,906,393 | * | 5/1999 | Mazur et al. ......................... 280/735 |
| 5,967,548 | * | 10/1999 | Kozyreff .............................. 280/735 |
| 5,983,148 | * | 11/1999 | Bigi et al. .............................. 701/45 |

FOREIGN PATENT DOCUMENTS 2507796   4/1996   (JP) .

* cited by examiner

*Primary Examiner*—Jacques H. Louis-Jacques
*Assistant Examiner*—Brian J. Broadhead
(74) *Attorney, Agent, or Firm*—Nixon Peabody LLP; Donald R. Studebaker

(57) ABSTRACT

An air bag system comprises a crash detector for detecting a crash of the vehicle, an inflator for generating pressurized gas in response to a detection of a crush, and an air bag located in front of a seat for which is inflated and expanded with the pressurized gas to a predetermined inflated configuration. A control unit controls actuation of the inflator in accordance with driving conditions and whether or not the passenger is fastened by the seat belt. Threshold values are provided such that the inflator provides high and low levels of gas pressure with which the air bag is inflated and expanded.

10 Claims, 8 Drawing Sheets

SEAT BELT NOT BUCKLED UP

SEAT BELT BUCKLED UP

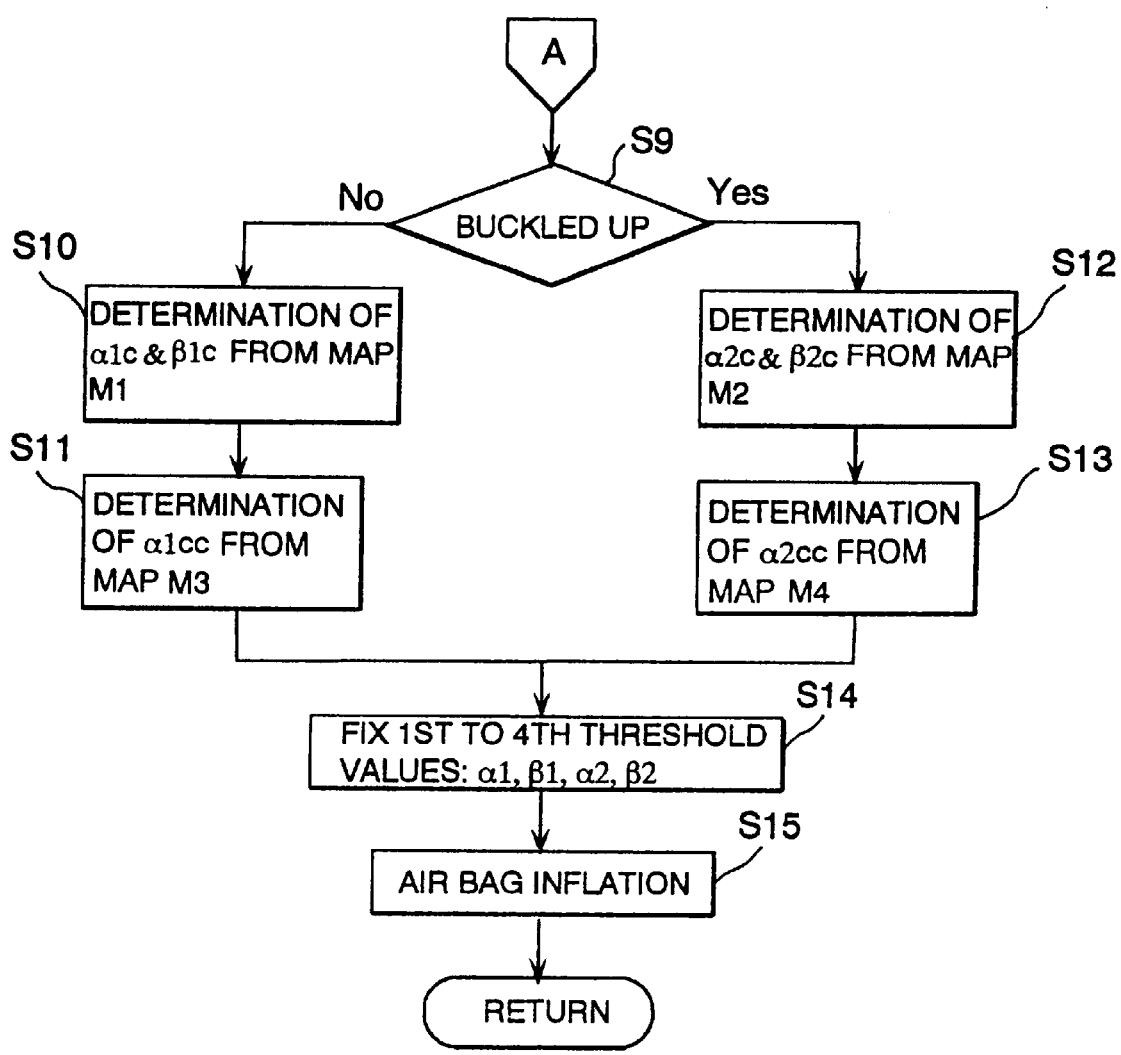

AIR BAG SYSTEM AS A SUPPLEMENTARY RESTRAINT SYSTEM TO SEAT BELT APPARATUS

BACKGROUND OF THE INVENTION

1. Field of the Invention

The present invention relates to an air bag system as a supplemental restraint system to a seat belt apparatus for a vehicle, and, more particularly, to an air bag system supplementary to a seat belt apparatus which inflates and expands an air bag with high and low levels of inflation pressure according to variable threshold values.

2. Description of the Related Art

Air bag systems are well known as a supplementary restraint system to seat belt apparatuses for vehicles in the art. Such an air bag system includes a plurality of crash sensors, an air bag installed in the inside of a steering wheel, and a control unit that controls inflation and expansion of the air bag in response to at least an output signal from any one of the crash sensors. The crash sensor may be an acceleration sensor that provides an electrical output signal having a value related to the energy of impact of a crash. The control unit evaluates incoming electrical signals to control inflation and expansion of the air bag upon an occurrence of a crash. An actuation circuit includes a squib to fire an inflammable fluid to generate inflation gas which is discharged into the air bag and inflates and expands it. Upon an occurrence of a crash, the air bag is instantaneously inflated and expanded to protect a passenger from hitting the steering wheel or front part of the passenger compartment.

The prior art air bag systems have recognized that it is not always desirable to inflate the air bag with 100% of the gas generated by firing the fluid. In recent years, there has been proposed air bag systems of a type in which the air bag is inflated and expanded with different inflation pressure, namely a low level of inflation pressure and a high level of inflation pressure according to whether the passenger is fastened by a seat belt or not.

The shock absorbing capacity of the air bag changes according to whether the passenger is fastened by the seat belt and/or the levels of inflation pressure with which the air bag is inflated and expanded. As shown in FIG. 3 regarding the shock absorbing capacity performance of an air bag with respect to vehicle crush speed, characteristic curves "a," "b" and "c" show the shock absorbing performance when the air bag is not inflated, when the air bag is inflated with a low level of inflation pressure and when the air bag is inflated with a high level of inflation pressure, respectively, while the passenger is not fastened by the seat belt. The characteristic curves "d," "e" and "f" show the shock absorbing performance when the air bag is not inflated, when the air bag is inflated with the low level of inflation pressure and when the air bag is inflated with the high level of inflation pressure, respectively, while the passenger is fastened by the seat belt. As apparent from FIG. 3, the shock absorbing performance of the air bag against the passenger is different among conditions of inflation and expansion of the air bag. Further, as shown by double-dotted line in FIGS. 4 and 5, the shock absorbing performance decreases with an increase in vehicle speed at an occurrence of a crash. This is because the higher the vehicle crash speed raises, the more the kinetic energy of the passenger has. Japanese Patent No. 2,507,796 discloses an air bag system of a type which includes two discharge valves and a valve controller. Both discharge valves adjust the internal gas pressure in the air bag during the inflation of the air bag. The valve controller controls the discharge valves according to whether the passenger is fastened by a seat belt, the weight of the passenger, the vehicle speed and so on. Specifically, the first discharge valve is controlled to maintain a first level of internal pressure of the air bag at which the air bag attains a first effective restraint state. The second discharge valve is controlled to maintain a second level of internal pressure of the air bag at which the air bag attains a second effective restraint state while the inflation gas pressure rises. When the air bag internal pressure reaches the first level of internal pressure during inflation and expansion of the air bag, the first valve discharges the inflation gas to maintain the first level of internal gas pressure. While the inflation gas pressure sharply rises after the air bag has attained the first effective restraint state, the second valve discharges the inflation gas pressure to maintain the second level of internal pressure. The air bag system adjusts the first and second levels of internal pressure to appropriate levels according to whether the passenger is fastened by the seat belt or not, the weight of the passenger, the vehicle speed to provide appropriately effective protection of the passenger during an occurrence of a crash.

Japanese Unexamined Patent Publication No.7-277123 discloses an air bag system equipped with an inflator incorporating an electrical heater which is effected while the seat belt is buckled up. The heater remains effective while the seat belt is unbuckled to heat an inflation gas so as to heat the inflation gas and rise its pressure with which the air bag is inflated when a crash is happened but switched off while the seat belt is buckled up.

Some of improved air bag systems are equipped with what is called a composite or multiple type of inflator unit having at least two inflators which can be actuated independently from each other. Both inflators discharge the same volume of an inflation gas into an air bag. Either one of the two inflators is actuated to inflate and expand the air bag with a low level of inflation gas pressure when a light crash is happened, or both inflators are actuated to inflate and expand the air bag with high level of inflation gas pressure when a crash is heavy.

None of air bag systems equipped with the multiple type of inflator unit varies a threshold value for actuating either one or both of the inflators according to whether the seat belt is buckled up and vehicle running states (which includes a vehicle speed, a steering angle and so on). For instance, the air bag system may be controlled such that the air bag is inflated with a low level of inflation pressure always at an occurrence of a crash and is subsequently inflated with a high level of inflation pressure. In such a case, while there is no problem when the crash velocity of a vehicle is relatively low, nevertheless, the impact absorbing performance will decrease to some extent when the crash velocity of a vehicle is relatively high.

SUMMARY OF THE INVENTION

It is, therefore, an object of the present invention to provide an air bag system as a supplementary restraint system to a seat belt for a vehicle which provides a reliable protection on a passenger during various types of crashes.

It is another object of the present invention to provide an air bag system which provides an effective protection on a passenger, irrespective of whether a passenger is fastened by a seat belt or not, or vehicle running states.

It is still another object of the present invention to provide an air bag system which controls inflation and expansion of an air bag appropriately according to whether a passenger is fastened by a seat belt or not, or vehicle running states and in which the inflated air bag surely contacts with a passenger to absorb the energy of impact caused due to a crash.

The foregoing objects of the invention are accomplished by providing an air bag system as a supplementary restraint system to a seat belt device for a vehicle in which an air bag is inflated and expanded with high and low inflation pressure according to driving conditions. The air bag system generates the low level of inflation gas pressure when the crash condition parameter, such as a crash velocity and a crash acceleration, exceeds a first threshold value and the high level of inflation pressure when the crash condition exceeds a second threshold value greater than the first threshold value while the seat belt is not buckled up, and generates the low level of inflation pressure when the crash condition parameter exceeds a third threshold value of the crash condition and the high level of inflation pressure when the crash condition parameter exceeds a fourth threshold value greater than the third threshold value while the seat belt is buckled up. The second threshold value is determined in close proximity to the third threshold value.

Preferably, the first threshold value is a lower limit of a range of the parameter in which the air bag inflated and expanded with the low level of inflation pressure has a higher impact absorbing effect on a passenger while the seat belt is not buckled up than the air bag not inflated and expanded, the second threshold value is a lower limit of a range of the parameter in which the air bag inflated and expanded with the high level of inflation pressure has a higher impact absorbing effect on a passenger while the seat belt is not buckled up than the air bag inflated and expanded with the low level of inflation pressure while the seat belt is not buckled up, the third threshold value is a lower limit of a range of the parameter in which the air bag inflated and expanded with the low level of inflation pressure has a higher impact absorbing effect on a passenger while the seat belt is buckled up than the air bag not inflated and expanded, and the fourth threshold value is a lower limit of a range of the parameter in which the air bag inflated and expanded with the high level of inflation pressure has a higher impact absorbing effect on a passenger while the seat belt is budded up than the air bag inflated and expanded with the low level of inflation pressure while the seat belt is buckled up.

A crash acceleration as a crash condition is detected by means of a plurality of acceleration sensors incorporated in the vehicle body, and a crash velocity is obtained from an integration of the crash acceleration with respect to a time. A switch is incorporated in a buckle of the seat belt to provide a signal when the seat belt is buckled up. In order to generate the high and low levels of inflation gas pressure, the air bag system incorporates a composite type of inflator unit having two inflators, either one of which is actuated to generate the low level of inflation gas pressure and both of which are actuated to generate the high level of inflation gas pressure. The inflator unit may incorporate a single inflator adapted to control internal pressure of the air bag in two levels, namely a high level and a low level of inflation gas pressure.

Because the first threshold value is smaller than the second threshold value, while the seat belt is not buckled up, the air bag system is not effected when the vehicle crashes at a crash acceleration or a crash velocity less than the first crash parameter, but actuates the inflator unit to inflate and expand the air bag with the low level of inflation gas pressure when the vehicle crashes at a crash acceleration between the first and second threshold values or actuates the inflator unit to inflate and expand the air bag with the high level of inflation gas pressure when the vehicle crashes at a crash acceleration greater than the second threshold value. Further, because the third threshold value is smaller than the fourth threshold value, while the seat belt is buckled up, the air bag system is not effected when the vehicle crashes at a crash acceleration or a crash velocity less than the third crash parameter, but actuates the inflator unit to inflate and expand the air bag with the low level of inflation gas pressure when the vehicle crashes at a crash acceleration between the third and fourth threshold values or actuates the inflator unit to inflate and expand the air bag with the high level of inflation gas pressure when the vehicle crashes at a crash acceleration greater than the fourth threshold value. Because the second and third threshold values are in close proximity to each other, these two threshold values may be replaced in greatness with each other according to changes various crash conditions.

Specifically, in an event of a crash while the seat belt is not buckled up, the passenger can escape from a danger when the crash condition is less than the first threshold value. However, the air bag is preferably inflated and expanded with the low inflation pressure to protect the passenger when the crash condition exceeds the first threshold value or with the high inflation pressure to protect passenger more securely when the crash condition exceeds the second threshold value. On the other hand, in an event of a crash while the seat belt is buckled up, the passenger is restrained and protected from can escape from flying out of a set during a crash during a crash at a crash condition less that the third threshold value in close proximity to the second threshold value even while the air bag is not inflated. However, the air bag is preferably inflated and expanded with the low inflation pressure to protect the passenger when the crash condition exceeds the third threshold value in close proximity to the second threshold value or with the high inflation pressure to protect passenger more securely when the crash condition exceeds the fourth threshold value.

The first threshold value is set to a lower limit of a range of crush conditions in which the air bag inflated and expanded with the low level of inflation pressure has a higher impact absorbing effect on a passenger than the air bag not inflated and expanded. That is, as shown in FIG. 3, the first threshold value is set to the lower limit value $\alpha 1$ of the range of crash velocities where the impact absorbing performance of the air bag represented by a characteristic curve "a" for the case that the air bag is not inflated is lower than that represented by a characteristic curve "b" for the case that the air bag is inflated with the low level of inflation pressure while the air bag is not inflated. The second threshold value is set to the lower limit value $\beta 1$ of the range of crash velocities where the impact absorbing performance of the air bag represented by the characteristic curve "b" is lower than that represented by a characteristic curve "c" for the case that the air bag is inflated with the high level of inflation pressure while the airbag is not inflated. The third threshold value is set to the lower limit value $\alpha 2$ of the range of crush velocities where the impact absorbing performance of the air bag represented by a characteristic curve "d" for the case that the air bag is inflated is lower than that represented by a characteristic curve "e" for the case that the air bag is inflated with the low inflation pressure while the air bag is inflated. The fourth threshold value is set to the lower limit value $\beta 2$ of the range of crash velocities where the impact absorbing performance of the air bag represented by the characteristic curve "e" is smaller than that represented by a characteristic curve "f" for the case that the air bag is inflated with the low inflation pressure while the air bag is inflated. Setting these threshold values described above, the air bag provides the maximum effect of impact absorption performance to the passenger irrespective of whether the passenger is fastened by the seat belt and protected with an maximum effect.

The first through third threshold values may be varied lower as the vehicle speed increases. The kinetic energy of the passenger and the inertia force of the vehicle affecting the passenger during a crash are increased proportionally to the vehicle speed. The lowered threshold values realizes the air bag to inflate properly with different levels of inflation pressure according to the heaviness of crashes. Further, the first threshold value may be varied at a first rate of decrease as the crash acceleration or the crash velocity or the steering angle becomes higher, and the third threshold value may be varied at a third rate of decrease smaller than the first rate of decrease as the crash acceleration or the crash velocity becomes higher.

The vehicle increasingly or decreasingly varies its inertia force proportionally to a change in vehicle speed. During turning, the impact absorption performance of the air bag decreases with an increase in steering angle. Consequently, the passenger is protected by the air bag more safely by lowering at least the first threshold value as the vehicle increases its speed steering angle or deceleration upon an occurrence of a crash. While it is desirable to lower the third threshold value as the vehicle increases its speed, steering angle or deceleration upon an occurrence of a crash, it is not always necessary. Because, when the passenger is fastened and restrained by the seat belt, the inertia force affecting on the passenger is lowered, an increment of the first threshold value is greater than that of the third threshold value for every specific vehicle speed, steering angle or deceleration upon an occurrence of a crash.

BRIEF DESCRIPTION OF THE DRAWINGS

The above and other objects and features of the invention will be apparent to those skilled in the art to which the present invention relates from the following description directed to a preferred embodiment of the invention when reading in conjunction with the accompanied drawings, in which:

FIGS. 10 and 11 are a flow chart showing the sequence routine of air bag inflation and expansion control.

DETAILED DESCRIPTION OF THE EMBODIMENTS

Figure 1:
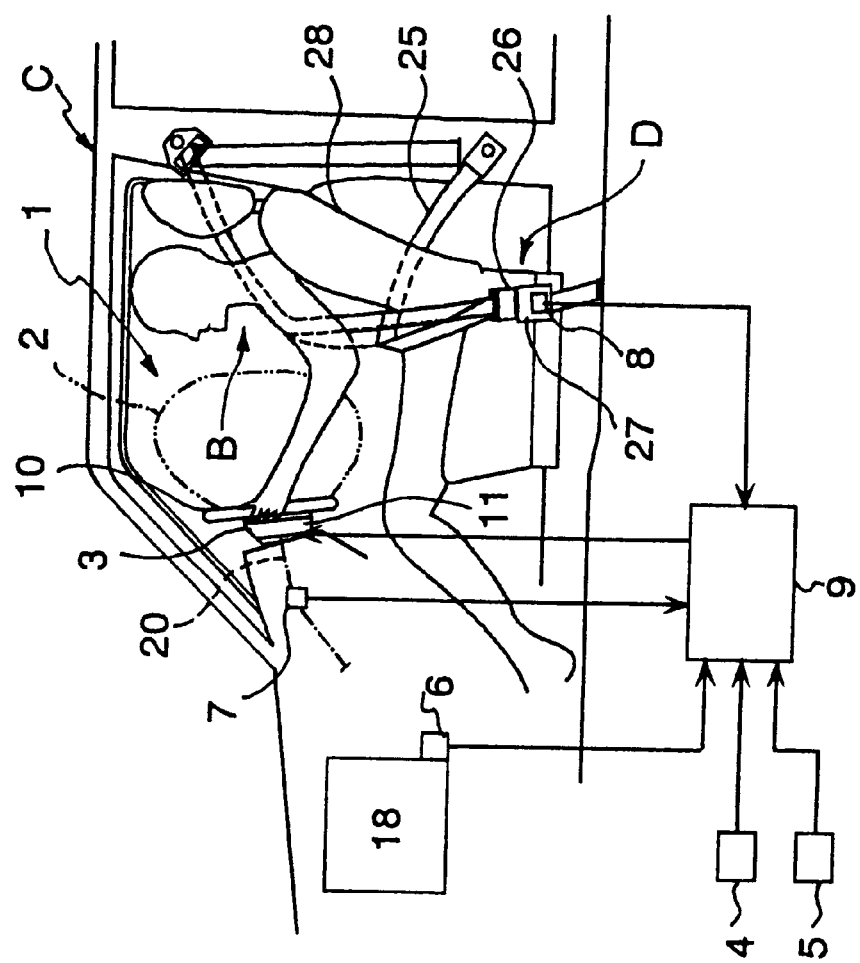
FIG. 1 is a schematic illustration of a front half of a vehicle equipped with an air bag system in accordance with an embodiment of the invention.

Referring to the drawings in detail, and, in particular, to FIG. 1 which schematically shows a passenger compartment C of a vehicle equipped with a seat belt system and an air bag system, i.e. a supplemental restraint system, in accordance with an embodiment of the invention. An air bag system 1 includes an air bag 2, an inflator unit 3, a pair of acceleration sensors 4 and 5, a vehicle speed sensor 6, a steering angle sensor 7, a seat belt switch 8 and a control unit 9. The air bag 2 is folded and is received in an air bag case 11 forming part of a steering wheel 10 and covered by a center pad 11a (see FIG. 2). The inflator unit 3 is installed in the air bag case 11 and discharges a gas into the air bag 2 in response an occurrence of a crash to inflate and expand the air bag 2. The acceleration sensors 4 and detect longitudinal and lateral acceleration of the vehicle and generate signals according to the acceleration. The acceleration sensors 4 are 5 are installed, for instance, to a front bumper frame and a cross member of a cowl, respectively. The vehicle speed sensor 6 detects a rotational speed of an output shaft of an engine 18 as a vehicle speed V and provides a signal representing the vehicle speed V. The steering angle sensor 7 detects a steering angle $\theta$ and provides a signal representing the steering angle $\theta$. The steering angle sensor 7 is connected installed to a steering shaft 20 and detects a rotational angle of the steering shaft 20. The seat belt switch 8, which is installed to a buckle 27 of a seat belt device D, detects a tongue 26 at one end of a seat belt 25 fastened to the buckle 27 of the seat belt device D. The seat belt switch 8 provides a signal while the tongue 26 is engaged with the buckle 27. The seat belt device D is installed to each of two front seats 28. The control unit 9 receives the signals from sensors and switches including at least the acceleration sensors 4 and 5, the vehicle speed sensor 6, the steering angle sensor 7 and the seat belt switch 8 and provides a trigger signal for the inflator unit 3.

Figure 2:
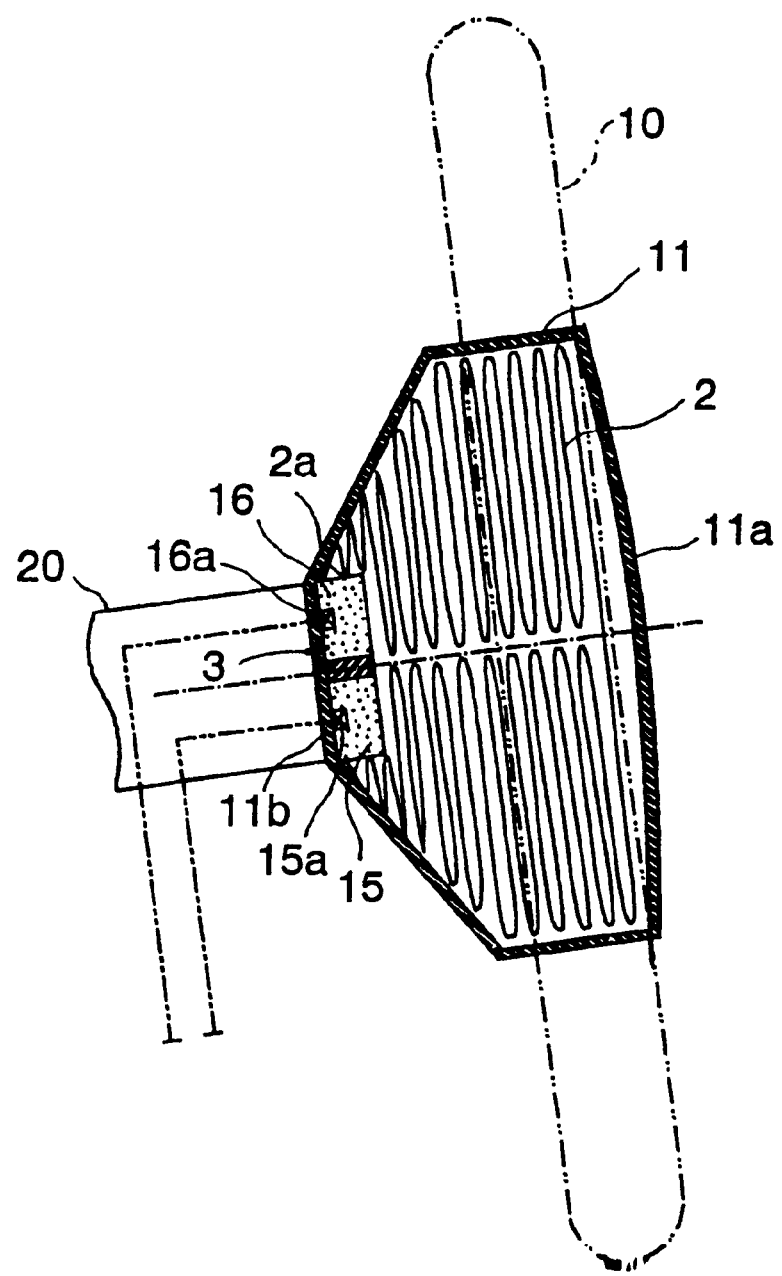
FIG. 2 is a cross-sectional view of an air bag unit incorporated in the air bag system.

Referring to FIG. 2 showing the air bag device D in detail, the air bag case 11, which is installed to the steering wheel 10 at its center and covered by the steering wheel pad 11a, extends forward from the steering wheel 10. The air bag 2 at its open end 2a is firmly fixed to a bottom 11b of the air bag case 11. The steering wheel pad 11a has a transversal line in the form of a thin groove along which it is able to be torn. Upon an occurrence of a crash of the vehicle, the air bag 2 is inflated rearward to break the steering wheel pad 11a along the tear line, so as to expand toward the passenger B to restrain the passenger B tightened by the seat belt 25 from being forced toward and hitting the steering wheel 10. The inflator unit 3, which is fixed to the bottom 11b of the air bag case 11 and enclosed by the open end of the air bag 2, includes a pair of inflators 15 and 16 and a pair of electrical heaters 15a and 16a. Both inflators 15 and 16 have substantially equal inflation capacity. The electrical heaters 15a and 16a is instantaneously heated to ignite inflammable liquid contained in the inflators 15 and 16, respectively. The control unit 9 controls heating the electrical heaters 15a and 16a. When at least one of the inflators 15 and 16 is actuated, it instantaneously heats its associated heater 15a, 16a to ignite the liquid to produce a high pressure of gas, so that the air bag 2 is inflated and expanded with the gas under a relatively low pressure. On the other hand, when both the inflators 15 and 16 are actuated, the air bag 2 is inflated and expanded with the gas under a relatively high pressure. The control unit 9 comprising a microcomputer includes input and output interfaces, a microcomputer and a driving circuit for the electric heaters 15a and 16a. A read only memory (ROM) stores various data such as first to fourth threshold or threshold speeds, control programs of the air bag inflation, maps and tables accompanying the control programs therein. Various memory areas are assigned to the control programs for air bag inflation control in a random access memory (RAM) of the microcomputer. The driving circuit drives the electrical heaters 15a and 16a.

Figure 3:
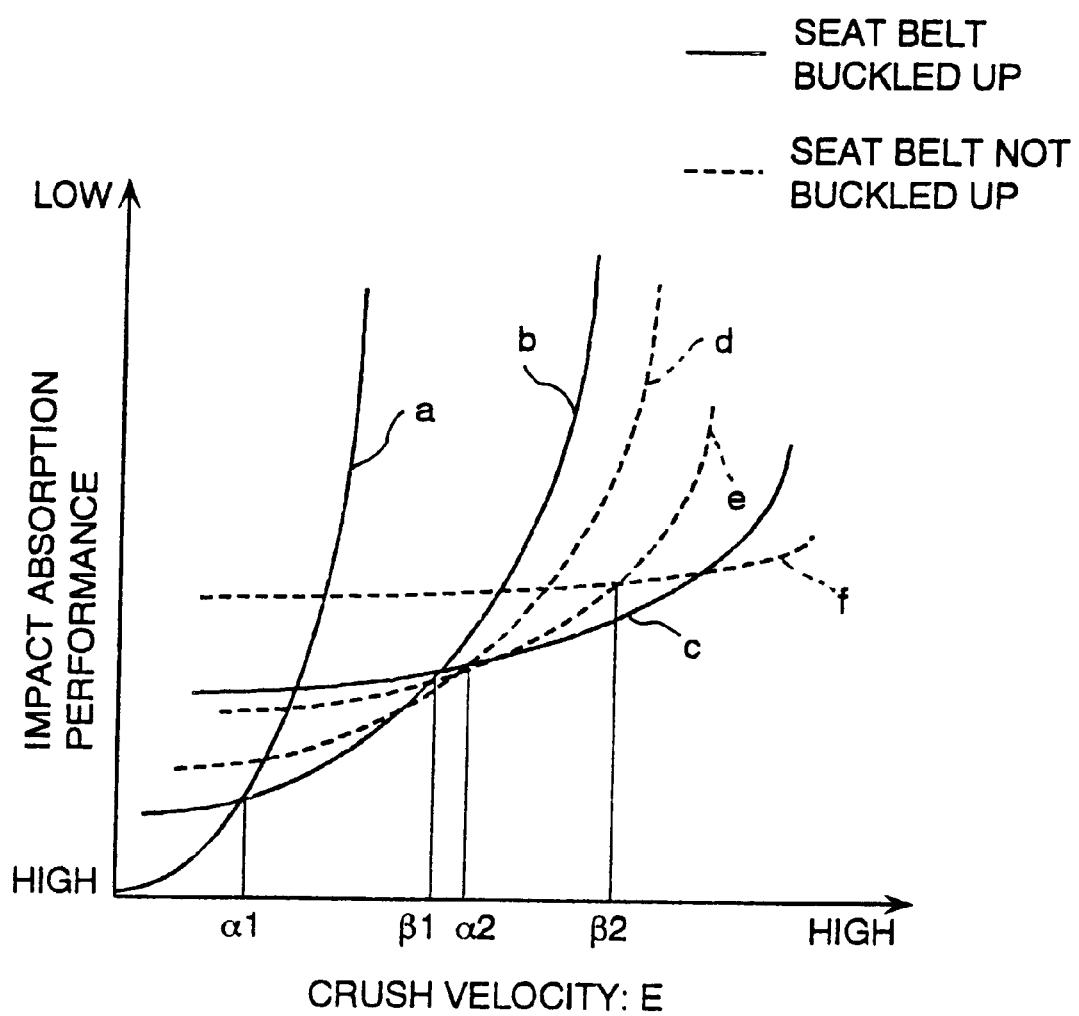
FIG. 3 is a graphical representation showing the relationship between impact absorbing performance and crash velocity.

FIG. 3 shows characteristic curves of the shock absorbing capacity with respect to vehicle speed upon a vehicle collision, the shock absorbing capacity indicating the degree that the air bag absorbs the energy of impact affecting the passenger in the event of a collision. Three solid curves "a," "b" and "c" show characteristics of the shock absorbing capacity with respect to a passenger who is not fastened by the seat belt 25, and three broken curves "d," "e" and "f" show characteristic of the shock absorbing capacity with respect to a passenger who is fastened by the seat belt 25. Specifically, the solid curve "a" shows the characteristic of the shock absorbing capacity for the purpose of threshold when the air bag 2 is not inflated; the solid curve "b" shows the characteristic of the shock absorbing capacity when the air bag 2 is inflated with low inflation pressure; and the solid line "c" shows the characteristic of the shock absorbing capacity when the air bag 2 is inflated with high inflation pressure. Similarly, the broken curve "d" shows the characteristic of the shock absorbing capacity for the purpose of threshold when the air bag 2 is not inflated; the broken curve "e" shows the characteristic of the shock absorbing capacity when the air bag 2 is inflated with low inflation pressure; and the curve "f" shows the characteristic of the shock absorbing capacity when the air bag 2 is inflated with high inflation pressure. These characteristic curves are found out through various crash tests of the vehicle.

As apparent from FIG. 3, the first threshold speed $\alpha 1$, the second threshold speed $\beta 1$, the third threshold speed $\alpha 2$ and the fourth threshold speed $\beta 2$ for vehicle crash velocity E are determined to actuate the inflators 15 and 16. Specifically, the first and second threshold speeds $\alpha 1$ and $\beta 1$ are critical vehicle crash speeds at which the air bag 2 is inflated with the relatively low inflation pressure and the relatively low inflation pressure, respectively, while a passenger is not fastened by the seat belt 25. The third and fourth threshold speeds $\alpha 2$ and $\beta 2$ are critical vehicle crash velocity at which the air bag 2 is inflated with the relatively high inflation pressure and the relatively high inflation pressure, respectively, while a passenger is not fastened by the seat belt 25. The first threshold speed $\alpha 1$, the second threshold speed $\beta 1$, the third threshold speed $\alpha 2$ and the fourth threshold speed $\beta 2$ may be determined with respect to vehicle crash acceleration in place of vehicle crash velocity E.

The first threshold speed $\alpha 1$ is smaller than the second threshold speed $\beta 1$ and the third threshold speed $\alpha 2$ is smaller than the fourth threshold speed $\beta 2$. Concerning the relation between the second threshold speed $\beta 1$ and the third threshold speed $\alpha 2$, the second threshold speed $\beta 1$ is smaller than the third threshold speed $\alpha 2$ but close to the third threshold speed $\alpha 2$. As there is a possibility that the second threshold speed $\beta 1$ and the third threshold speed $\alpha 2$ fluctuate according to various conditions, the second threshold speed $\beta 1$ may be larger than but close to the third threshold speed $\alpha 2$ or may be nearly equal to the third threshold speed $\alpha 2$. The first to fourth threshold speeds $\alpha 1$, $\beta 1$, $\alpha 2$ and $\beta 2$ are determined such that the air bag 2 provides a maximum shock absorbing effect in the event of a crash of the vehicle. As apparent from FIG. 3, the first threshold speed $\alpha 1$ is the smallest vehicle crash velocity E of a range in which the shock absorbing effect is more enhanced by the air bag 2 inflated with the relatively low inflation pressure than by the air bag 2 remaining not inflated. The second threshold speed $\beta 1$ is the smallest vehicle crash velocity E of a range in which the shock absorbing effect is more enhanced by the air bag 2 inflated with the relatively high inflation pressure than by the air bag 2 inflated with the relatively low inflation pressure. The third threshold speed $\alpha 2$ is the smallest vehicle crash speed E of a range in which the shock absorbing effect is more enhanced by the air bag 2 inflated with the low inflation pressure than by the air bag 2 remaining not inflated. The fourth threshold speed $\beta 2$ is the smallest vehicle crash velocity E of a range in which the shock absorbing effect is more enhanced by the air bag 2 inflated with the relatively high inflation pressure than by the air bag 2 inflated with the relatively low inflation pressure.

Figure 4:
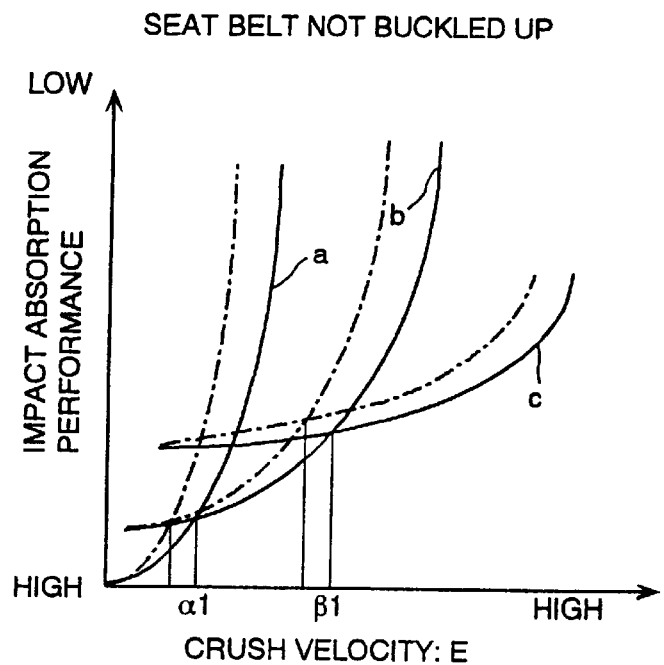
FIGS. 4 and 5 are graphical representations showing a change in the relationship between impact absorbing performance and crash velocity.
Figure 5:
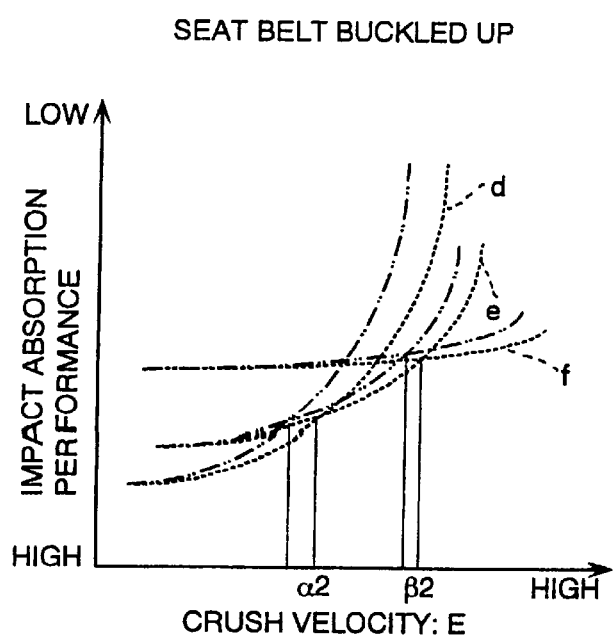

As inertia force affecting the passenger during a crash is increased with an increase in vehicle speed V, the characteristic curves shown in FIG. 3 vary as shown by chained curves in FIGS. 4 and 5. For this reason, the respective threshold speeds $\alpha 1$, $\beta 1$, $\alpha 2$, and $\beta 2$ are varied smaller as the vehicle speed V becomes higher, and the first and third threshold speeds $\alpha 1$ and $\alpha 2$ are varied smaller as the steering angle $\theta$ becomes larger. The vehicle speed V and the steering angle $\theta$ just before a crash are used to vary the respective threshold speeds $\alpha 1$, $\beta 1$, $\alpha 2$, and $\beta 2$.

Figure 6:
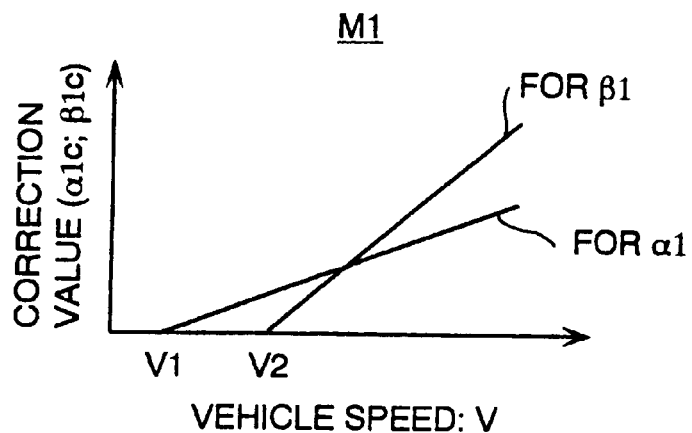
FIG. 6 is a graphical representation showing the relationship between correction values for first and second threshold values and vehicle velocity.
Figure 7:
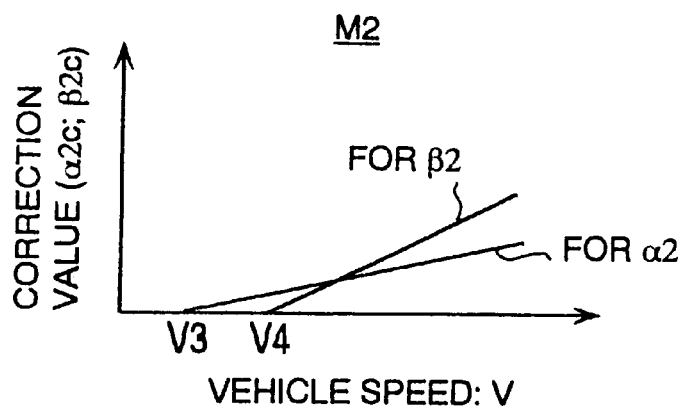
FIG. 7 is a graphical representation showing the relationship between correction values for third and fourth threshold values and vehicle velocity.

Specifically, as shown in FIG. 6, a correction value $\alpha 1c$ of the first threshold speeds $\alpha 1$ is proportionally varied with an increase in vehicle speeds V greater than a critical speed V1 based on a threshold speed correction map M1 for the case that a passenger is not fastened by the seat belt 25, and a correction value $\beta 1c$ of the first threshold speeds $\beta 1$ is proportionally varied with an increase in vehicle speeds V greater than a critical speed V2 (which is greater than the critical speed V1) based on a threshold speed correction map M1 for the case that a passenger is not fastened by the seat belt 25. The increasing rate of the first correction value $\alpha 1c$ is smaller than that of the second correction speed $\beta 1c$. Similarly, as shown in FIG. 7, a correction value $\alpha 2c$ of the third threshold speeds $\alpha 2$ is proportionally varied with an increase in vehicle speeds V greater than a critical speed V3 based on a threshold speed correction map M2 for the case that a passenger is fastened by the seat belt 25, and a correction value $\beta 2c$ of the fourth threshold speeds $\beta 2$ is proportionally varied with an increase in vehicle speeds V greater than a critical speed V4 (which is greater than the critical speed V3) based on a threshold speed correction map M2 for the case that a passenger is fastened by the seat belt 25. The increasing rate of the third correction value $\alpha 2c$ is smaller than that of the fourth correction value $\beta 2c$.

Figure 8:
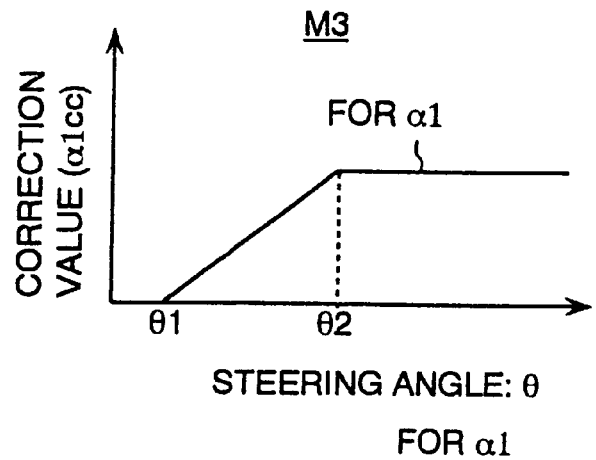
FIG. 8 is a graphical representation showing the relationship between correction value for the first threshold value and steering angle.
Figure 9:
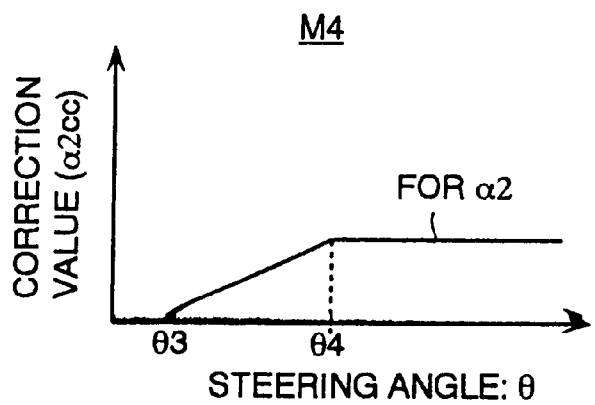
FIG. 9 is a graphical representation showing the relationship between correction value for the third threshold value and steering angle.

FIG. 8 shows a threshold speed correction map M3 with respect to steering angle $\theta$. A correction value $\alpha 1cc$ of the first threshold speed is varied for steering angles greater than a critical angle $\theta 1$. Specifically, the first correction value $\alpha 1cc$ is proportionally increased with an increase in steering angle $\theta$ between critical angles $\theta 1$ and $\theta 2$ and remains constant for steering angles greater than the critical angle $\theta 2$. Similarly, as shown in FIG. 8 which is a threshold speed correction map M4 with respect to steering angle $\theta$, a correction value $\alpha 2cc$ of the third threshold speed is varied for steering angles greater than a critical angle $\theta 3$. Specifically, the third correction value $\alpha 1cc$ is proportionally increased with an increase in steering angle $\theta$ between critical angles $\theta 3$ and $\theta 4$ and remains constant for steering angles greater than the critical angle $\theta 4$. The increasing rate of the first correction value $\alpha 1cc$ between the steering angles $\theta 1$ and $\theta 2$ is greater than the increasing rate of the third correction value $\alpha 2cc$ between the steering angles $\theta 3$ and $\theta 4$. The critical angle $\theta 1$ may be equal to or smaller than the critical angle $\theta 3$, and the critical angle $\theta 2$ may be equal to or smaller than the critical angle $\theta 4$.

The control unit 9 controls the first to fourth threshold speeds $\alpha 1$, $\beta 1$, $\alpha 2$ and $\beta 2$ and their correction values $\alpha 1c$, $\beta 1c$, $\alpha 2c$, $\beta 2c$, $\alpha 1cc$ and $\alpha 2cc$ according to vehicle speeds V and steering angles $\theta$ on the basis of the control maps M1, M2, M3 and M4, and further controls inflation and expansion of the air bag 2 according to crash velocities E.

Figure 10:
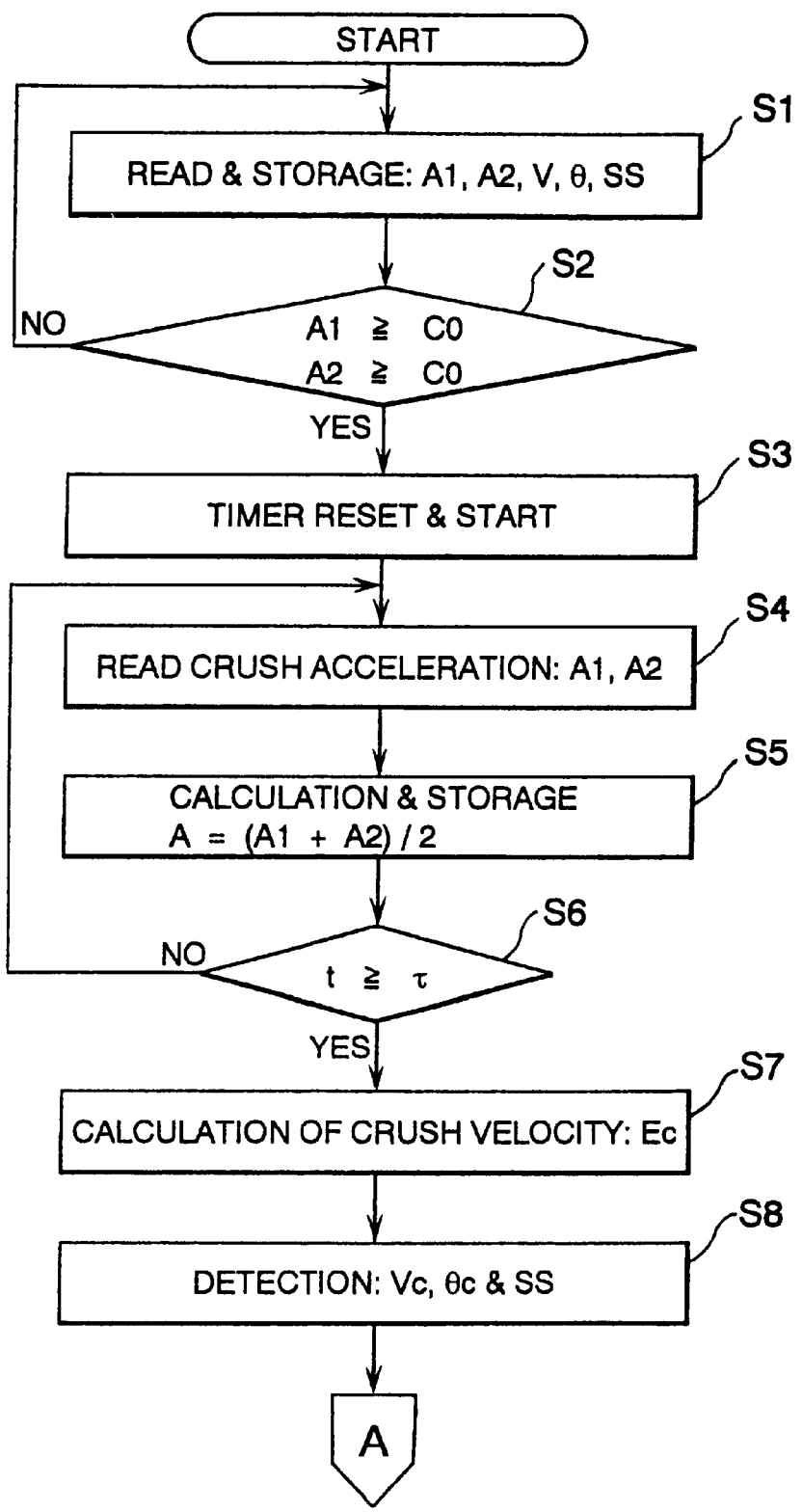

Reference is now made to FIGS. 10 and 11 which show a flow chart illustrating air bag inflation and expansion control sequence routine. The sequence routine is repeatedly executed every specified short period, e.g. 1 millisecond. When the flow chart logic begins following a start of the vehicle and control proceeds to a function block at step S1 where the control unit 9 is initialized and reads incoming signals from the various sensors to store crash accelerations A1 and A2, a vehicle speed V, a steering angle $\theta$ and seat belt switch signal SS in a resister of the RAM memory. At step S2, both accelerations A1 and A2 are compared with a specified acceleration C0. When neither the acceleration A1 nor the acceleration A2 is greater than the specified acceleration C0, the flow chart logic orders return to step S1. If both accelerations A1 and A2 are equal to or greater than the specified acceleration C0, this indicates that a crash is happened, then, an internal timer T is reset and starts to count time at step S3. Subsequently, the accelerations A1 and A2 are read out from the resister at step S4 to determine and store an average acceleration A in the register at step S5. This average acceleration A is stored in the register and used later to calculate a crash velocity E. At step S6, a timer count t of the timer T is compared with a specified time $\tau$ of, for example, 8 milliseconds, which is very short. After having waited a lapse of the specified time $\tau$ at step S6, a calculation is made at step S7 to find a crush velocity Ec by integrating average accelerations A stored in the resister during the lapse of the specified time $\tau$. At step S8, a vehicle speed Vc and a steering angle $\theta c$ immediately before the crash, and a seat belt switch signal SS, which have been stored in the register at step S1, are found by accessing the register.

Subsequently, at step S9, a judgment is made based on data relating to the seat belt switch signal SS as to whether the seat belt 25 has been buckled up. As a result of the judgment, correction values $\alpha 1c$ and $\beta 1c$ are determined according to the vehicle speed Vc by use of the control map M1 at step S10 if the seat belt 25 is not buckled up, and, subsequently, a correction value $\alpha 1cc$ is determined according to the steering angle $\theta c$ by use of the control map M3 at step S11. Otherwise, correction values $\alpha 2c$ and $\beta 2c$ are determined according to the vehicle speed Vc by use of the control map M2 at step S12 if the seat belt 25 is not buckled up, and, subsequently, a correction value $\alpha 2cc$ is determined according to the steering angle $\theta c$ by use of the control map M4 at step S13. After determination of the correction values $\alpha 1c$, $\beta 1c$ and $\alpha 1cc$ at steps S10 and S11 or $\alpha 2c$, $\beta 2c$ and $\alpha 2cc$ at steps S12 and S13, actual first through fourth threshold speeds $\alpha 1$, $\beta 1$ $\alpha 2$ and $\beta 2$ are determined by adding these correction values to first through fourth threshold speeds $\alpha 1$, $\beta 1$ $\alpha 2$ and $\beta 2$ previously stored in the register, respectively at step S14. Specifically, a resultant first threshold speed $\alpha 1$ is determined by adding the correction values $\alpha 1c$ and $\alpha 1cc$ to a first threshold speed $\alpha 1$ previously stored in the register; a resultant second threshold speed $\beta 1$ is determined by adding the correction value $\beta 1c$ to a second threshold speed $\beta 1$ previously stored in the register; a resultant third threshold speed $\alpha 2$ is determined by adding the correction values $\alpha 2c$ and $\alpha 2cc$ to a second threshold speed $\alpha 2$ previously stored in the register; and a resultant fourth threshold speed $\beta 2$ is determined by adding the correction value $\beta 2c$ to a fourth threshold speed $\beta 2$ previously stored in the register. Finally, at step S15, air bag inflation and expansion controlling processing is executed according to the crash velocity Ec and the resultant first through fourth threshold speeds $\alpha 1$, $\beta 1$ $\alpha 2$ and $\beta 2$. In the air bag inflation and expansion controlling processing, while the seat belt 25 is not buckled up, neither the inflators 15 and nor the inflator 16 is actuated to leave the air bag 2 as it is when the crash velocity Ec is less than the first threshold speed $\alpha 1$, only the inflator 15 is actuated to inflate the air bag 2 with the relatively low inflation pressure when the crash velocity Ec is equal to or greater than the first threshold speed $\alpha 1$ but less than the second threshold speed $\beta 1$, or both inflators 15 and 16 are actuated to inflate and expand the air bag 2 with the relatively high inflation pressure when the crash velocity Ec is equal to or greater than the second threshold speed $\beta 1$. On the other hand, while the seat belt 25 is buckled up, neither the inflators 15 and nor the inflator 16 is actuated to leave the air bag 2 as it is when the crash velocity Ec is less than the third threshold speed $\alpha 2$, only the inflator 15 is actuated to inflate the air bag 2 with the relatively low inflation pressure when the crash velocity Ec is equal to or greater than the third threshold speed $\alpha 2$ but less than the third threshold speed $\beta 2$, or both inflators 15 and 16 are actuated to inflate and expand the air bag 2 with the relatively high inflation pressure when the crash velocity Ec is equal to or greater than the fourth threshold speed $\beta 2$.

According to the air bag system 1 of the invention, regardless of fastening or not fastening the seat belt 25, the first to fourth threshold speeds $\alpha 1$, $\beta 1$, $\alpha 2$ and $\beta 2$ are determined suitably for the air bag 2 to absorb the energy of impact against the passenger B upon a crash in the maximum. Therefore the air bag system 1 demonstrate its restraint function just sufficiently to protect the passenger B safely irrespective of fastening or not-fastening the seat belt 25.

In view of the fact that the inertia force of the passenger caused by a crash is enhanced in proportion to an increase in vehicle speed Vc, the first through fourth threshold speeds $\alpha 1$, $\beta 1$, $\alpha 2$ and $\beta 2$ are varied smaller as the vehicle speed Vc becomes larger, so that the air bag 2 is inflated and expanded with inflation pressure meeting the vehicle speed Vc, which is always desirable for effective protection of the passenger B.

The ability to protect the passenger B of the air bag 2 decreases with a change in steering angle $\theta$ while the vehicle C is turning. While the passenger B is not fastened by the seat belt 25, a crash during turning provides much possibility of an occurrence of secondary collision of the passenger B against a part of the vehicle body, such as a front pillar, a side door and so on, other than the air bag 2. The first threshold speed $\alpha 1$ and the third threshold speed $\alpha 2$ are varied smaller with an increase in steering angle $\theta$, so that the safety of the passenger B at an occurrence of a crash is improved. Similarly, since, while the passenger B is fastened and restrained by the seat belt 25, the influence of an steering angle $\theta$ on motion of the passenger B is eased even at an occurrence of a crash, the correction value $\alpha 1cc$ is made larger than the correction value $\alpha 2cc$ for every steering angle $\theta$.

In the event that the seat belt 25 is buckled up, as the passenger B is securely restrained to the seat by the seat belt 25, it is not always necessary to vary or correct the third threshold speed $\alpha 2$ according to steering angles $\theta$. In the embodiment described above, the air bag system 1 employs a compound type of inflator unit which has a pair of the inflators 15 and 16 having substantially equal inflation volumes, which is always desirable to . eliminate special valves and electric heaters and to simplify the air bag system 1 with an effect of miniaturization and low manufacture costs.

The second and fourth threshold speeds β1 and β2 may be varied smaller as the steering angle θ becomes larger. In the event where a crash is happened while the vehicle C is decelerating, the inertia force affecting the passenger B is enhanced. Therefore the first through fourth threshold speeds α1, β1, α2 and β2 may be varied or corrected as the deceleration becomes larger. Further, the first through fourth threshold speeds α1, β1, α2 and β2 may be determined according to crash accelerations in place of crash velocities E. It may be permitted to store the characteristic curves shown in FIG. 3 in the ROM to determine the first through threshold speeds α1, β1, α2 and β2 through calculations based on the characteristic curves. In addition to the characteristic curves of impact absorption with respect to crash speeds shown in FIG. 3, there may be provided a plurality of characteristic curves of impact absorption such as shown by double-doted line in FIGS. 4 and 5 for various specific vehicle speeds and steering angles based on which correction values are determined for the first through fourth threshold speeds α1, β1, α2 and β2.

A single inflator type of inflator unit may be employed instead of the composed type of inflator unit. In this case, the inflation pressure is controlled in two steps, namely a low level of inflation pressure and a high level of inflation pressure.

It is to be understood that although the present invention has been described with regard to preferred embodiment thereof, various other embodiments and variants may occur to those skilled in the art, which are within the scope and spirit of the invention, and such embodiments and variants are intended to be covered by the following claims.

What is claimed is:

1. An air bag system as a supplementary restraint system to a seat belt device for a vehicle in which an air bag is inflated and expanded with high or low inflation pressure according to driving conditions, said air bag system comprising:

seat belt detection means for detecting whether a seat belt is buckled up;

crash condition detection means for detecting a parameter relating to one of a crash acceleration and a crash velocity at a crash of said vehicle;

inflating means for generating high and low levels of inflation pressure with which said air bag is inflated and expanded;

angle detection means for detecting a steered angle of said vehicle; and control means for controlling said inflating means to generate said low level of inflation pressure when said crash condition detection means detects a first threshold value of said parameter and said high level of inflation pressure when said crush condition detection means detects a second threshold value greater than said first threshold value when said belt detection means detects that said seat belt is not buckled up, and to generate said low level of inflation pressure when said crash condition detection means detects a third threshold value of said parameter and said high level of inflation pressure when said crash condition detection means detects a fourth threshold value greater than said third threshold value when said seat belt detection means detects that said seat belt is buckled up;

wherein said third threshold value and said fourth threshold value are determined so as to be greater than said first threshold value and said second threshold value, respectively, and said control means decreases said first threshold value and said third threshold value smaller as said steered angle is increase.

2. The air bag system as defined in claim 1, wherein said control means varies said first threshold value by a first decrement and third threshold value by a third decrement smaller than said first decrement for each specific point of said steered angle.

3. An airbag system as a supplementary restraint system to a seat belt device for a vehicle in which an air bag is inflated and expanded with high and low inflation pressure according to driving conditions, said air bag system comprising:

seat belt detection means for detecting whether a seat belt is buckled up;

crash condition detection means for detecting a parameter relating to one of a crash acceleration and a crash velocity at a crash of said vehicle;

inflating means for generating high and low levels of inflation pressure with which said air bag is inflated and expanded;

speed section means for detecting a vehicle speed of said vehicle; and control means for controlling said inflating means to generate said low level of inflation pressure when said crash condition detection means detects a first threshold value of said parameter and said high level of inflation pressure when said crash condition detection means detects a second threshold value greater than said first threshold value while said seat belt detection means detects that said seat belt is not buckled up, and to generate said low level of inflation pressure when said crash condition detection means detects a third threshold value of said parameter and said high level of inflation pressure when said crash condition detection means detects a fourth threshold value greater than said third threshold value while said seat belt detection means detects that said seat belt is buckled up;

wherein said third threshold value and said fourth threshold value are determined so as to be greater than said first threshold value and said second threshold value, respectively, and control means decreases said second threshold value and said fourth threshold value as said vehicle speed is increased such that a rate of change relative to a change in said vehicle speed is greater for said second threshold value than for said fourth threshold value.

4. An air bag system as defined in claim 3, wherein said second threshold value is decreased when said vehicle speed is higher than a first specified speed, and said fourth threshold value is decreased when said vehicle speed is higher than a second specified speed which is greater than said first specified speed.

5. An air bag system as defined in claim 3, wherein said first threshold value is decreased when said vehicle speed is higher than first specified speed, and said third threshold value is decreased when said vehicle speed is higher than a second specified speed which is greater than said first specified speed.

6. An air bag system as a supplementary restraint system to a seat belt device for a vehicle in which an air bag is inflated and expanded with high and low inflation pressure according to driving conditions, said air bag system comprising:

seat belt detection means for detecting whether a seat belt is buckled up;

crash condition detection means for detecting a parameter relating to one of a crash acceleration and a crash velocity at a crash of said vehicle;

inflating means for generating high and low levels of inflation pressure with which said air bag is inflated and expanded;

speed detection means for detecting a vehicle speed of said vehicle; and control means for controlling said inflating means to generate said low level of inflation pressure when said crash condition detection means detects a first threshold value of said parameter and said high level of inflation pressure when said crash condition detection means detects a second threshold value greater than said first threshold value while said seat belt detection means detects that said seat belt is not buckled up, and to generate said low level of inflation pressure when said crash condition detection means detects a third threshold value of said parameter and said high level of inflation pressure when said crash condition detection means detects a fourth threshold value greater than said third threshold value while said seat belt detection means detects that said seat belt is buckled up;

wherein said third threshold value and said fourth threshold value are determined so as to be greater than said first threshold value and said second threshold value, respectively, and said control means decreases said first threshold value and said third threshold value as said vehicle speed is increased such that a rate change relative to a change in said vehicle speed is greater for first threshold value than for said third threshold value.

7. An air bag system as a supplementary restraint system to a seat belt device for a vehicle in which an air bag is inflated and expanded with high and low inflation pressure according to driving conditions, said air bag system comprising:

seat belt detection means for detecting whether a seat belt is buckled up;

crash condition detection means for detecting a parameter relating to one of a crash acceleration and a crash velocity at a crash of said vehicle;

inflating means for generating high and low levels of inflation pressure with which said air bag is inflated and expanded;

speed detection means for detecting a vehicle speed of said vehicle; and control means for controlling and inflating means to generate said low level of inflation pressure when said crash condition detection means detects a first threshold value of said parameter and said high level of inflation pressure when said crash condition detection means detects a second threshold value greater than said firs threshold value while said seat belt detection means detects that said seat belt is not buckled up, and to generate said low level of inflation pressure when said crash condition detection means detects a third threshold value of said parameter and said high level of inflation pressure when said crash condition detects a fourth threshold value greater than said third threshold value while said seat belt detection means detects that said seat belt is buckled up;

wherein said first threshold value is a lower limit of a range of said parameter in which said air bag inflated and expanded with said low level of inflation pressure has a higher impact absorbing effect on a passenger while said seat belt is not buckled up than said air bag not inflated and expanded, said second threshold value is a lower limit of a range of said parameter in which said air bag inflated and expanded with said high level of inflation pressure has a higher impact absorbing effect on a passenger when said seat belt is not buckled up than said air bag inflated and expanded with said low level of inflation pressure while said seat belt is not buckled, up, said third threshold value is a lower limit of a range of said parameter in which said air bag inflated and expanded with said low level of inflation pressure has a higher impact absorbing effect on an passenger while said seat belt is buckled up than said air bag not inflated and expanded, and said fourth threshold value is a lower limit of a range of said parameter in which said air bag inflated and expanded with said high level of inflation pressure has a higher impact absorbing effect on a passenger while said seat belt is buckled up than said air bag inflated and expanded with said low level of inflation pressure while said seat belt is buckled up; and wherein said third threshold value and said fourth threshold value are determined so as to be greater than said first threshold value and said second threshold value, respectively, and said control means decreases said first threshold value and said second threshold value as said vehicle speed is increased such that a rate of change relative to a change in said vehicle speed is greater for said second threshold value than for said first threshold value.

8. An air bag system as a supplementary restraint system to a seat belt device for a vehicle in which an air bag is inflated and expanded with high and low inflation pressure according to driving conditions, said air bag system comprising:

seat belt detection means for detecting whether a seat belt is buckled up;

crash condition detection means for detecting a parameter relating to one of a crash acceleration and a crash velocity at a crash of said vehicle;

inflating means for generating high and low levels of inflation pressure with which said air bag is inflated and expanded;

speed detection means for detecting a vehicle speed of said vehicle; and control means for controlling said inflating means to generate said low level of inflation pressure when said crash condition detection means detects a first threshold value of said parameter and said high level of inflation pressure when said crash condition detection means detects a second threshold value grater than said first threshold value while said seat belt detection mean detects that said seat belt is not buckled up, and to generate said low level of inflation pressure when said crash condition detection means detects a third threshold value of said parameter and said high level of inflation pressure when said crash condition detection means detects a fourth threshold value greater than said third threshold value while said seat belt detection means detects that said seat belt is buckled up;

wherein said first threshold value is a lower limit of a range of said parameter in which said air bag inflated and expanded with said low level of inflation pressure has a higher impact absorbing effect on a passenger while said seat belt is not buckled up than said air bag not inflated and expanded, said second threshold value is a lower limit of a range of said parameter in which said air bag inflated and expanded with said high level of inflation pressure has a higher impact absorbing effect on a passenger while said seat belt is not buckled up than said air bag inflated and expanded with said low level of inflation pressure while said seat belt is not buckled up, said third threshold value is a lower limit of a range of said parameter in which said air bag inflated and expanded with said low level of inflation pressure has a higher impact absorbing effect on a passenger while said seat belt is buckled up than said air bag not inflated and expanded, and said fourth threshold value is a lower limit of a range of said parameter in which said air bag inflated and expanded with said high level of inflation pressure has a higher impact absorbing effect on a passenger while said seat belt is buckled up than said air bag inflated and expanded with said low level of inflation pressure while said seat belt is buckled up; and wherein said third threshold value and said fourth threshold are determined so as to be greater than said first threshold value and said second threshold value, respectively, and said control means decreases said third threshold value and said fourth threshold value as said vehicle speed is increased such that a rate of change relative to a change in said vehicle speed is greater for said fourth threshold value than for said third threshold value.

9. An air bag system as a supplementary restraint system to a seat belt device for a vehicle in which an air bag is inflated and expanded with high and low inflation pressure according to driving conditions, said air bag system comprising:

seat belt detection means for detecting whether a seat belt is buckled up;

crash condition detection means for detecting a parameter relating to one of a crash acceleration and a crash velocity at a crash of said vehicle;

inflating means for generating high and low levels of inflation pressure with which said air bag is inflated and expanded;

angle detection means for detecting a steered angle of said vehicle; and control means for controlling said inflating means to generate said low level of inflation pressure when said crash condition detection means detects a first threshold value of said parameter and said high level of inflation pressure when said crash condition detection means detects a second threshold value greater than said first threshold value while said seat belt detection means detects that said seat belt is not buckled up, and to generate said low level of inflation pressure when said crash condition detection means detects a third threshold value of said parameter and said high level of inflation pressure when said crash condition detection means detects a fourth threshold value greater than said third threshold value while said seat belt detection means detects that said seat belt is buckled up;

wherein said third threshold value and said fourth threshold value are determined so as to be greater than said first threshold value and said second threshold value, respectively, and said control means decreases said first threshold value as said steered angle is increased while leaving said third threshold value unchanged.

10. An air bag system as a supplementary restraint system to a seat belt device for a vehicle in which an air bag is inflated and expanded with high and low inflation pressure according to driving conditions, said air bag system comprising:

seat belt detection means for detecting whether a seat belt is buckled up;

crash condition detection means for detecting a parameter relating to one of a crash acceleration and a crash velocity at a crash of said vehicle;

inflating means for generating high and low levels of inflation pressure with which said air bag is inflated and expanded;

angle detection means for detecting a steered angle of said vehicle; and control means for controlling said inflating means to generate said low level of inflation pressure when said crash condition detection means detects a first threshold value of said parameter and said high level of inflation pressure when said crash condition detection means detects a second threshold value greater than said first threshold value while said seat belt detection means detects that said seat belt is not buckled up, and to generate said low level of inflation pressure when said crash condition detection means detects a third threshold value of said parameter and said high level of inflation pressure when said crash condition detection means detects a fourth threshold value greater than said third threshold value while said seat belt detection means detects that said seat belt is buckled up;

wherein said third threshold value and said fourth threshold value are determined so as to be greater than said first threshold value and said second threshold value, respectively, and said control means decreases said second threshold value and said fourth threshold value as said steered angle is increased.

* * * * *